US009246965B1

(12) United States Patent
Stoica et al.

(10) Patent No.: US 9,246,965 B1
(45) Date of Patent: Jan. 26, 2016

(54) SOURCE ASSIGNMENT BASED ON NETWORK PARTITIONING

(71) Applicant: Conviva Inc., San Mateo, CA (US)

(72) Inventors: Ion Stoica, Piedmont, CA (US); Hui Zhang, Pittsburgh, PA (US); Xi Liu, Belmont, CA (US); Florin Dobrian, Norfolk, VA (US); Henry Milner, Berkeley, CA (US)

(73) Assignee: Conviva Inc., Foster City, CA (US)

( * ) Notice: Subject to any disclaimer, the term of this patent is extended or adjusted under 35 U.S.C. 154(b) by 271 days.

(21) Appl. No.: 13/752,252

(22) Filed: Jan. 28, 2013

Related U.S. Application Data

(60) Provisional application No. 61/697,225, filed on Sep. 5, 2012.

(51) Int. Cl.
*H04L 12/853* (2013.01)
*H04L 12/911* (2013.01)
*H04L 29/06* (2006.01)

(52) U.S. Cl.
CPC ............ *H04L 65/60* (2013.01); *H04L 65/4092* (2013.01); *H04L 65/80* (2013.01)

(58) Field of Classification Search
CPC ...... H04L 65/80; H04L 65/4092; H04L 65/60
See application file for complete search history.

(56) References Cited

U.S. PATENT DOCUMENTS

| 6,711,622 | B1 * | 3/2004 | Fuller et al. | 709/231 |
|---|---|---|---|---|
| 6,892,307 | B1 * | 5/2005 | Wood et al. | 726/8 |
| 7,574,488 | B2 | 8/2009 | Matsubara | |
| 7,689,485 | B2 * | 3/2010 | Kanekar et al. | 705/35 |
| 8,589,473 | B2 * | 11/2013 | Bruss | 709/203 |
| 2004/0057420 | A1 * | 3/2004 | Curcio et al. | 370/352 |
| 2004/0128682 | A1 * | 7/2004 | Liga et al. | 725/35 |
| 2004/0187159 | A1 * | 9/2004 | Gaydos et al. | 725/92 |
| 2005/0010915 | A1 * | 1/2005 | Chen | 717/170 |
| 2008/0063195 | A1 * | 3/2008 | Li | 380/200 |
| 2013/0151673 | A1 * | 6/2013 | Gouache et al. | 709/219 |
| 2014/0150046 | A1 * | 5/2014 | Epstein et al. | 725/126 |
| 2014/0245359 | A1 * | 8/2014 | De Foy et al. | 725/62 |
| 2014/0348049 | A1 * | 11/2014 | Kim et al. | 370/312 |

OTHER PUBLICATIONS

Elo et al., "Virtual URLs for Browsing & Searching Large Information Spaces", WebNet Journal, pp. 38-43, p. 66, Jan.-Mar. 1999.

* cited by examiner

*Primary Examiner* — Aaron Strange
(74) *Attorney, Agent, or Firm* — Van Pelt, Yi & James LLP

(57) ABSTRACT

Directing a video player to a video source is disclosed. An indication that a client requires video streaming instructions is received. A past download performance for a plurality of clients that or correlated to the client requiring video streaming instructions is determined. At least one of: a content source, and a bitrate, is selected, based at least in part on the determined past download performance of the plurality of correlated clients. The client is provided with instructions based at least in part on the selection.

21 Claims, 11 Drawing Sheets

|  | DMA | | | | |
|---|---|---|---|---|---|
| ASN | 0.2 (CDN 2) | 0.1 (CDN 1) | 0.2 (CDN 1) | 1.2 (CDN 1) | 1.8 (CDN 1) |
| | 0.3 (CDN 1) | 1.5 (CDN 2) | 1.2 (CDN 2) | 0.1 (CDN 1) | 0.2 (CDN 1) |
| | 0.6 (CDN 1) | 0.1 (CDN 1) | 0.4 (CDN 2) | 0.1 (CDN 2) | 0.3 (CDN 2) |

602

Best CDN *(buffering ratio)*

Figure 6

SOURCE ASSIGNMENT BASED ON NETWORK PARTITIONING

CROSS REFERENCE TO OTHER APPLICATIONS

This application claims priority to U.S. Provisional Patent Application No. 61/697,225 entitled SOURCE ASSIGNMENT BASED ON NETWORK PARTITIONING filed Sep. 5, 2012 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are ongoing challenges in distributing that content efficiently and with high quality. As one example, when a client requests content (e.g., a particular television episode), the content may be available in multiple bitrates from multiple sources. Unfortunately, the client may not receive the content from the most appropriate source, or in the most appropriate bitrate.

BRIEF DESCRIPTION OF THE DRAWINGS

Various embodiments of the invention are disclosed in the following detailed description and the accompanying drawings.

FIG. 6 illustrates a table depicting a selection of the best CDN for a given DMA/ASN pair.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
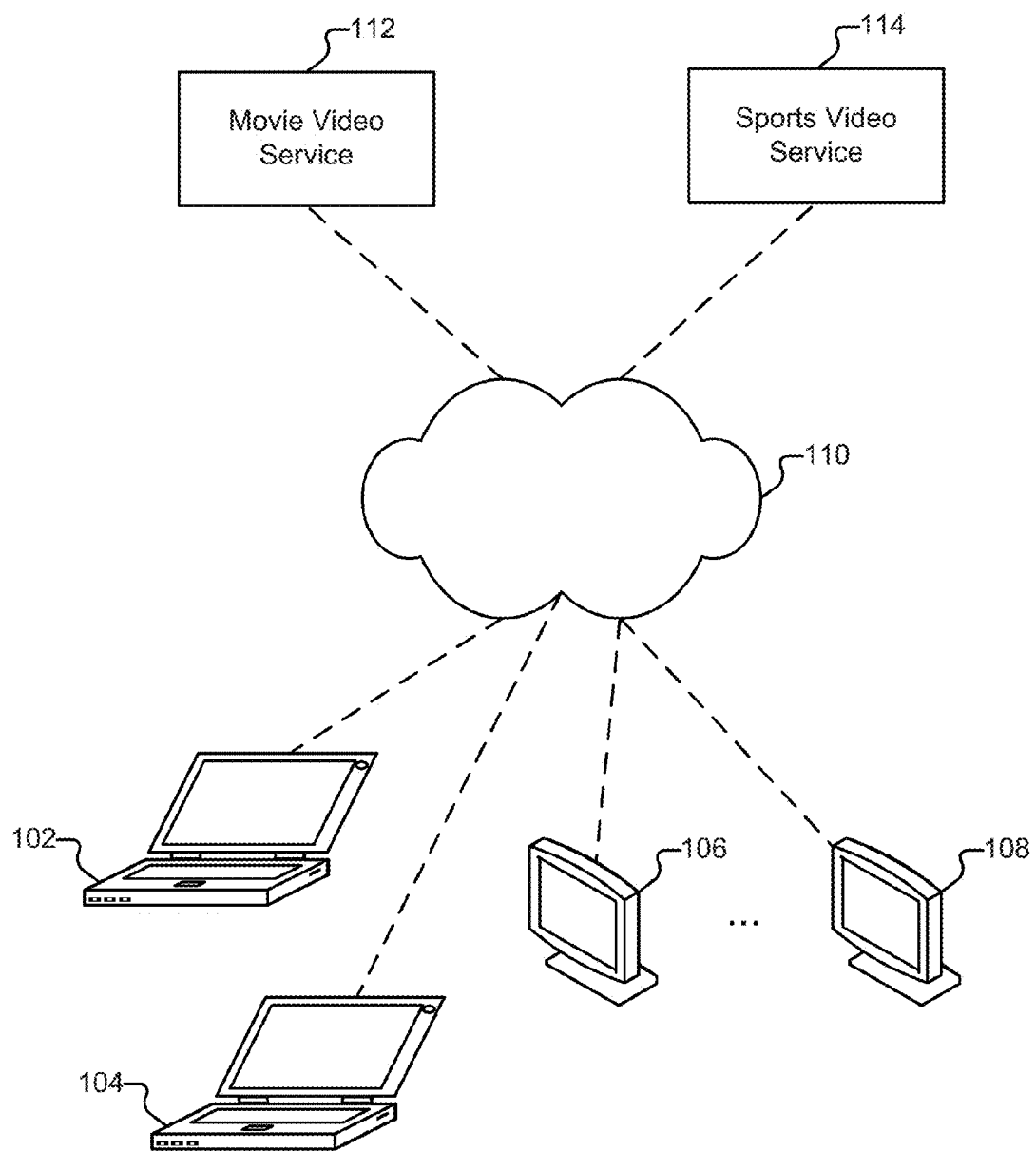
FIG. 1 illustrates an environment in which content is distributed.

FIG. 1 illustrates an environment in which content is distributed. In the example shown, client devices are used to access content, such as audiovisual content (e.g., movies, songs, television shows, sporting events, games, images, etc.) that is owned by content owners. Content is stored (or captured) at origin servers, then distributed via other servers, caches, content delivery networks (CDNs), proxies, etc. (collectively, "content sources"). Examples of CDNs include Akamai, Limelight Networks, and Level 3 Communications. Content sources employ a variety of technologies and include HTTP, Adobe Flash Media, and Microsoft Internet Information Service servers. Examples of clients include personal computers, laptops, cellular phones/personal digital assistants, and other types of information appliances such as set-top boxes, game consoles, broadband routers, file servers, video servers, and digital video recorders, as applicable.

In the example shown in FIG. 1, client device 102 is operated by a user hereinafter referred to as Alice. Alice lives in the Washington, D.C. area. Her Internet Service Provider (ISP) is hereinafter referred to as "ACME Internet." Suppose Alice wishes to watch a movie, streamed to client device 102 via one or more networks (represented as a single network cloud 110), from movie video service 112. Client device 102 includes a web browser application. Alice uses the web browser application to navigate to a portal owned by movie video service 112, such as "http://movievideoservice12.com/welcome." Her request for a particular movie is directed to a particular CDN and ultimately to a particular CDN node. Her client device begins streaming the content from the CDN node, which is in turn rendered in her browser (e.g., via a Flash or Silverlight player).

The CDN (and/or CDN node) assigned to Alice's client device can be selected in a variety of ways. As one example, a CDN can be selected based on current estimated load, or for financial reasons (e.g., where traffic to one CDN is preferred over another). Further, a given CDN node can be assigned (e.g., by the CDN) based on its distance to Alice (i.e., with the CDN node that is the fewest hops away from her client device being selected). As another example, a CDN node may be assigned based on a load balancing scheme, irrespective of or in addition to its distance from Alice. As will be described in more detail below, the CDN node closest to Alice (or that would be assigned based, e.g., on a round robin load balancing scheme) may or may not offer her the best viewing experience relative to other CDN nodes having been assigned (including those belonging to other CDNs). Using the techniques described herein, a decision of which content source should be used, and/or what bitrate should be used, can be made. As will be described in more detail below, such decisions can be made both at the time Alice initially requests content, and also as an ongoing decision. Also as will be described in more detail below, such decisions can be made for Alice's client based on historical performance information collected from other client devices that share some commonality with her client.

Client device 104 is operated by a user hereinafter referred to as Bob. Bob also lives in Washington, D.C., and also likes to stream movies from service 112. Bob's ISP is "Beta Telecommunications." Many additional client devices (represented by client devices 106 and 108) connect to service 112, from a variety of geographical locations (e.g., Milwaukee and Albuquerque), via a variety of ISPs. Client devices also connect to other services, such as sports video service 114.

Quality Issue Examples

Figure 2:
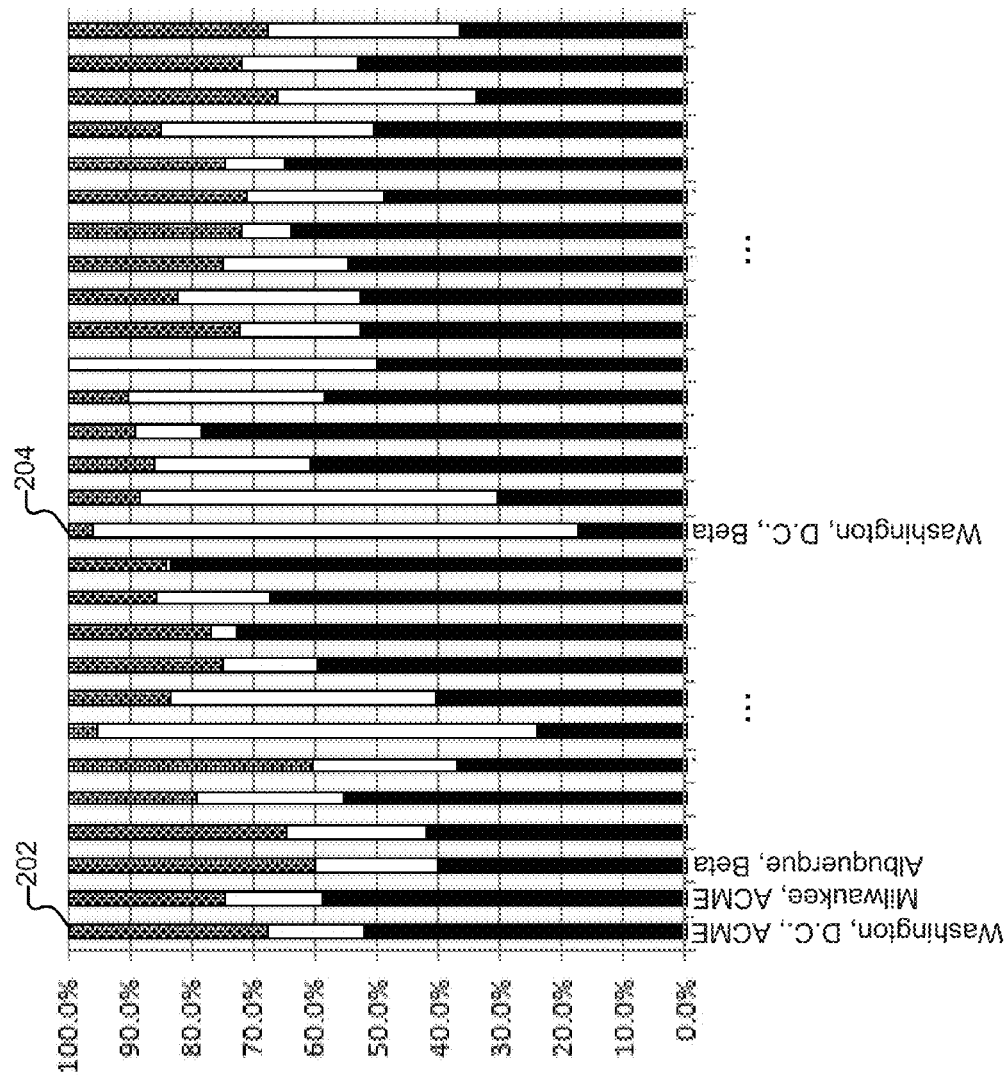
FIG. 2 depicts an example of the performance associated with three different content delivery networks (CDNs).

FIG. 2 depicts an example of a performance metric associated with three different content delivery networks (CDNs). In particular, FIG. 2 depicts the percentage of time a given CDN provides the best performance for a particular combination of a Designated Market Area (DMA) and an Autonomous System Number (ASN). For a given combination, performance with respect to each of three CDNs is shown as a stack, where CDN 1 is depicted as the black portion of the stack, CDN 2 is depicted as the white portion of the stack, and CDN 3 is represented as the crosshatched portion of the stack. A variety of measures of performance can be used—whether individually or in combination. Examples include, but are not limited to: (1) the number/percentage of client connection failures, (2) how quickly a video begins playing on a client (e.g., number of seconds until playback starts), (3) the amount of time clients spend buffering (e.g. as a buffering ratio), and (4) whether the maximum bandwidth of the client is used. The example shown depicts an aggregate assessment of quality (e.g., taking into account all four measures by weighting each equally). Other aggregation techniques can also be used. For example, buffering ratio can be weighted more heavily than other factors. As another example, not all factors need be aggregated—some can be omitted.

Using bar 202 as an example: approximately 51% of the time, an arbitrary client located in Washington, D.C. and serviced by ACME will have the best video streaming experience when connected to CDN 1. CDN 2 will provide the best experience to the client approximately 16% of the time, and CDN 3 will provide the best experience to the client approximately 33% of the time. Using bar 204 as another example: approximately 17% of the time, an arbitrary client also located in Washington, D.C., but serviced by Beta will have the best video streaming experience when connected to CDN 1. CDN 2 will provide the best experience to the client approximately 76% of the time, and CDN 3 will provide the best experience to the client approximately 5% of the time. Thus, even though Alice and Bob are both located in Washington, D.C., their respective clients will likely experience different performance when connecting to the same CDN (e.g., CDN 1), because they have different ISPs. Specifically, Alice's client is most similar to clients represented by bar 202, and Bob's client is most similar to clients represented by bar 204.

Figure 3:
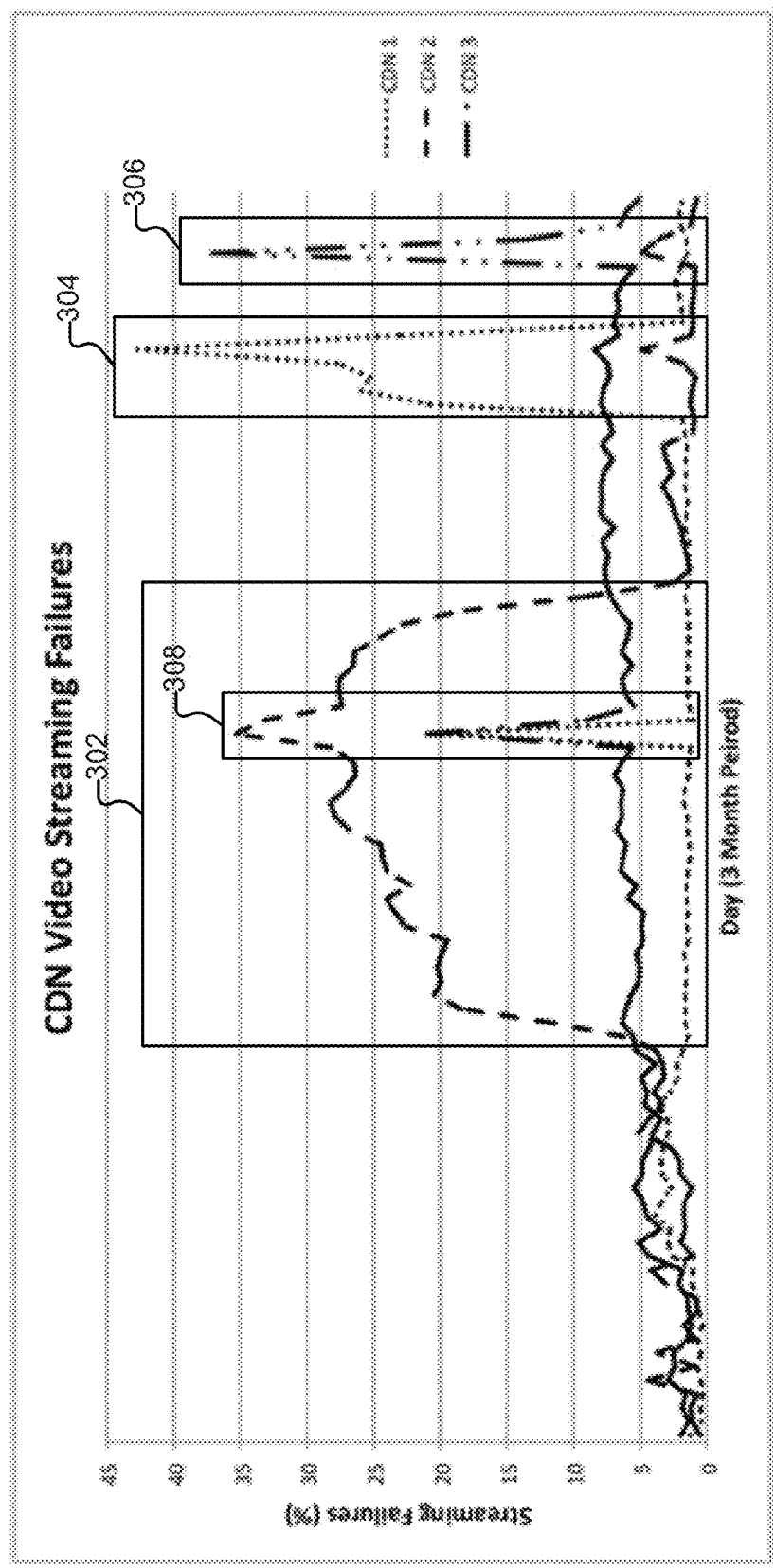
FIG. 3 depicts examples of both uncorrelated and correlated quality issues.

FIG. 3 depicts examples of both uncorrelated and correlated quality issues. In particular, FIG. 3 depicts, over a three month period, the percentage of connection failures experienced by clients attempting to connect to each of the three CDNs. During period 302, CDN 2 had the worst performance (i.e., had the most connection failures). During period 304, CDN 1 had the worst performance, and during period 306, CDN 3 had the worst performance. Further, during period 308, all three CDNs experienced a failure spike (i.e., a correlated failure). One reason for such a spike is a period of high load (e.g., a holiday weekend or national sporting event when many people watch videos at the same time).

Determining Assignments

Figure 4:
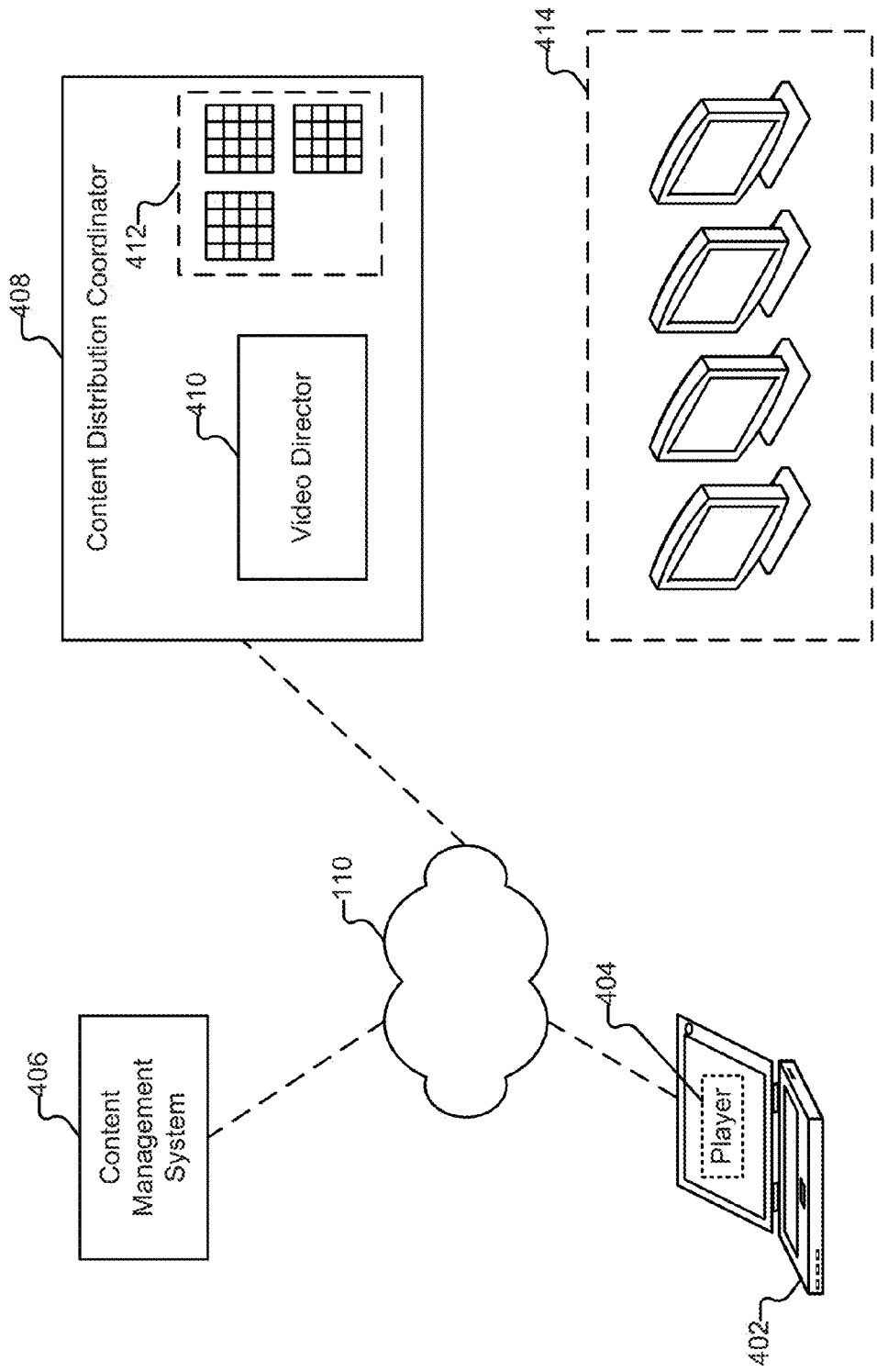
FIG. 4 illustrates an environment in which source assignment based on partitioning is performed.

FIG. 4 illustrates an environment in which source assignment based on partitioning is performed. Suppose an operator of a client device, such as client device 402, wishes to watch a video using video player application 404. In some embodiments, the player application is a dedicated application. In other embodiments, the player application is provided by a web browser application. In the example shown, client device 402 connects to Content Management System (CMS) 406 (e.g., via one or more networks 110) and requests the content. As will be described in more detail below, information about the client device (e.g., its IP address, User Agent string, what type of device it is, what operating system it is running, firmware version, browser type/version, player version, display size, and/or any other applicable attributes) is used to determine a set of other client devices that are correlated with client 402. Historical performance of devices in that set is evaluated to determine a content source and/or bitrate for client 402. Instructions for contacting the content source and obtaining the content are then provided to client 402. In some embodiments, content management system 406 contacts content distribution coordinator 408 to determine the set of instructions to provide to device 402. In other embodiments (e.g., described in conjunction with FIG. 8), content management system 406 redirects client 402's request (e.g., via HTTP redirect).

In some embodiments, content management system 406 and content distribution coordinator 408 are operated by the same entity. For example, an online movie streaming service could operate both content management system 406 and content distribution coordinator 408. Content distribution coordinator can also be operated by other entities. For example, content distribution coordinator 408 can be operated by an operator of a CDN. Content distribution coordinator 408 can operate independently of content management system 406 and/or independently of a CDN. As one example, the owner of content distribution coordinator 408 could provide services to multiple content management systems (e.g., one associated with movie service 112 and one associated with sports video service 114) and/or multiple CDNs.

As will be described in more detail below, quality experienced by clients such as clients 414 is measured and stored by content distribution coordinator 408. The information obtained from/about clients 414 is partitioned (412) and can be used, e.g., by a video direction engine 410 to predict a performance quality likely to be experienced by a client device if it is assigned a given content source.

Figure 5A:
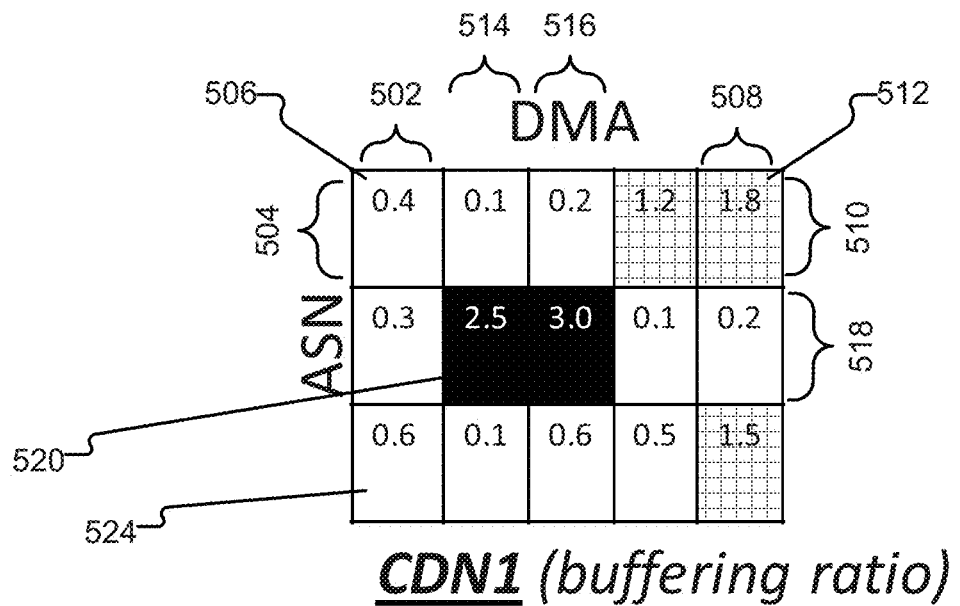
FIGS. 5A and 5B depict examples of partitioning pertaining to two CDNs.
Figure 5B:
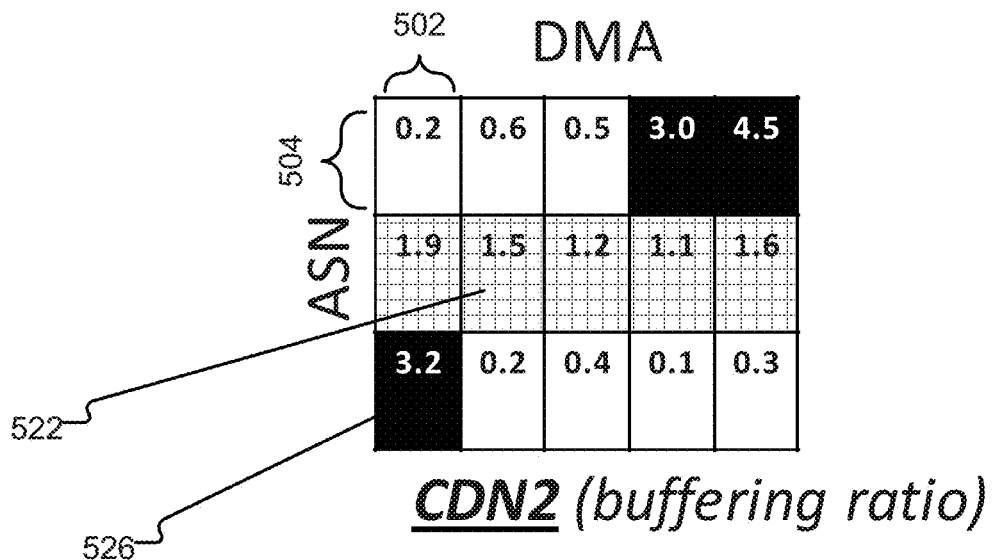

FIGS. 5A and 5B depict examples of partitioning pertaining to two CDNs. In particular, FIG. 5A shows, for clients located in one of five DMAs, and located within one of three ASNs, the buffering ratio experienced with respect to CDN 1. For example, clients in DMA 502 and in ASN 504 experience a buffering ratio of 0.4 (506). Clients in DMA 508 and in ASN 510 have a worse (higher) buffering ratio—1.8 (512). Clients in either of DMA 516 or 518, and also in ASN 514 have the worst buffering ratios—2.5 and 3.0, respectively.

FIG. 5B shows, for the same ASN/DMA partitioning as FIG. 5A, the buffering ratio experienced with respect to CDN 2. For some clients, CDN 2 will provide better performance than CDN 1. As one example, compare the values in regions 520 and 522. For some clients, CDN 2 will provide worse performance than CDN 1. As one example, compare the values in regions 524 and 526.

When a client, such as client device 402, requests content, information such as is shown in FIGS. 5A and 5B can be used (e.g., by content distribution coordinator 408) to determine whether to assign the client CDN 1 or CDN 2 as a content source. Other decisions can also be made using similar information, such as determining which CDN node to assign and/or determining which bitrate to assign. Further, once a video is being played on a client, information such as is shown in FIGS. 5A and 5B can be used to assess the predicted impact switching the client from one content source to another (or adjusting the bitrate) would have.

The values depicted in FIGS. 5A and 5B pertain to a single quality metric—buffering ratio. Data for other metrics can also be used in partitioning (e.g., pertaining to failed connection attempts). Further, the data can combined in a variety of ways. For example, a bitrate dimension can be added (i.e., further partitioning the clients based on their bitrates). Other attributes can also be used to partition the data, such as client type (e.g., desktop computer vs. tablet computer), browser (e.g., Internet Explorer vs. Firefox), and display size (e.g., 17" vs. 10").

FIG. 6 illustrates a table depicting a selection of the best CDN for a given DMA/ASN pair. In particular, each cell in FIG. 6 corresponds to whichever of CDN 1 or CDN 2 provides a better performance quality for the DMA/ASN pair represented by the cell. For example, compare clients in DMA 502/ASN 504 pair with respect to CDN 1 and CDN 2. Such clients have a predicted buffering ratio of 0.4 if connected to CDN 1, and a predicted buffering ratio of 0.2 if connected to CDN 2. Accordingly, CDN 2 is a better choice for performance reasons (as indicated in cell 602).

In the examples shown in FIGS. 5A and 5B, the values included in a given cell (e.g., the value of 0.4 appearing in cell 506) represent the buffering ratio experienced by the average client included in the given partition (i.e., the score is determined as an average of the buffering ratios of all clients in the set). Other techniques can also be used to assess the quality scores. For example, a distribution of buffering ratios can be determined, and only those clients having scores in the second/third quartile used as predictors, or of specific percentiles (e.g., $80^{th}$ percentile).

Figure 7:
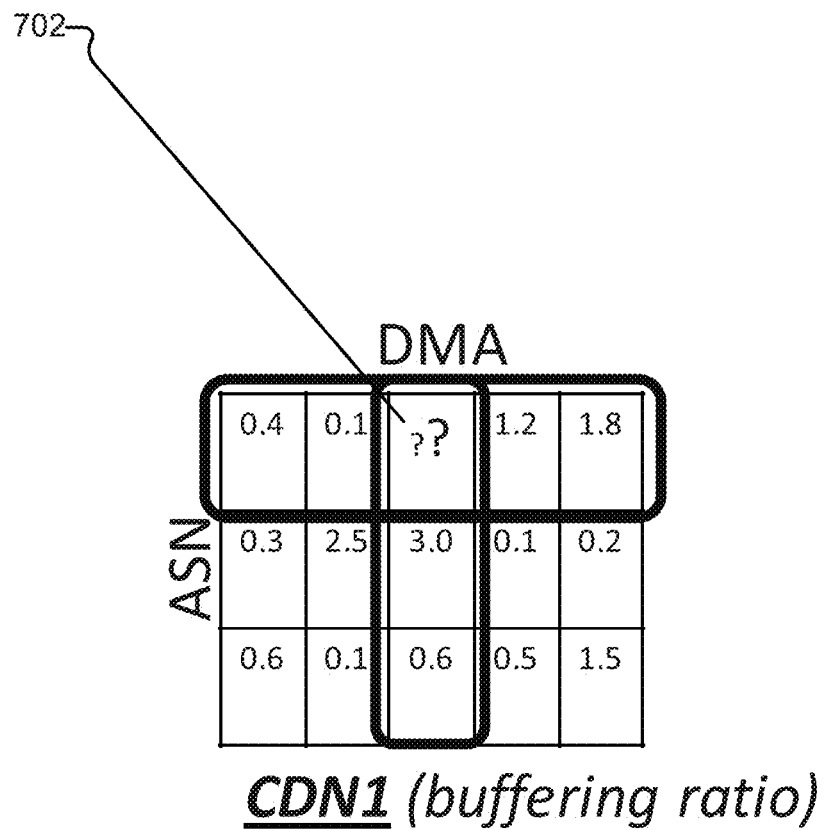
FIG. 7 depicts an example of a partition that includes limited information.

In some cases, a given partition may have data on few or no clients. Such a scenario is depicted in FIG. 7. Specifically, information pertaining to clients in cell 702 is limited. In some embodiments, when a given partition has insufficient information to make a reliable prediction, a larger partition is used. For example, the quality experienced by all clients in the same ASN can be aggregated, and/or the quality experienced by all clients in the same DMA can be aggregated, and used to predict which CDN would be best for a client having the attributes of cell 702.

Figure 8:
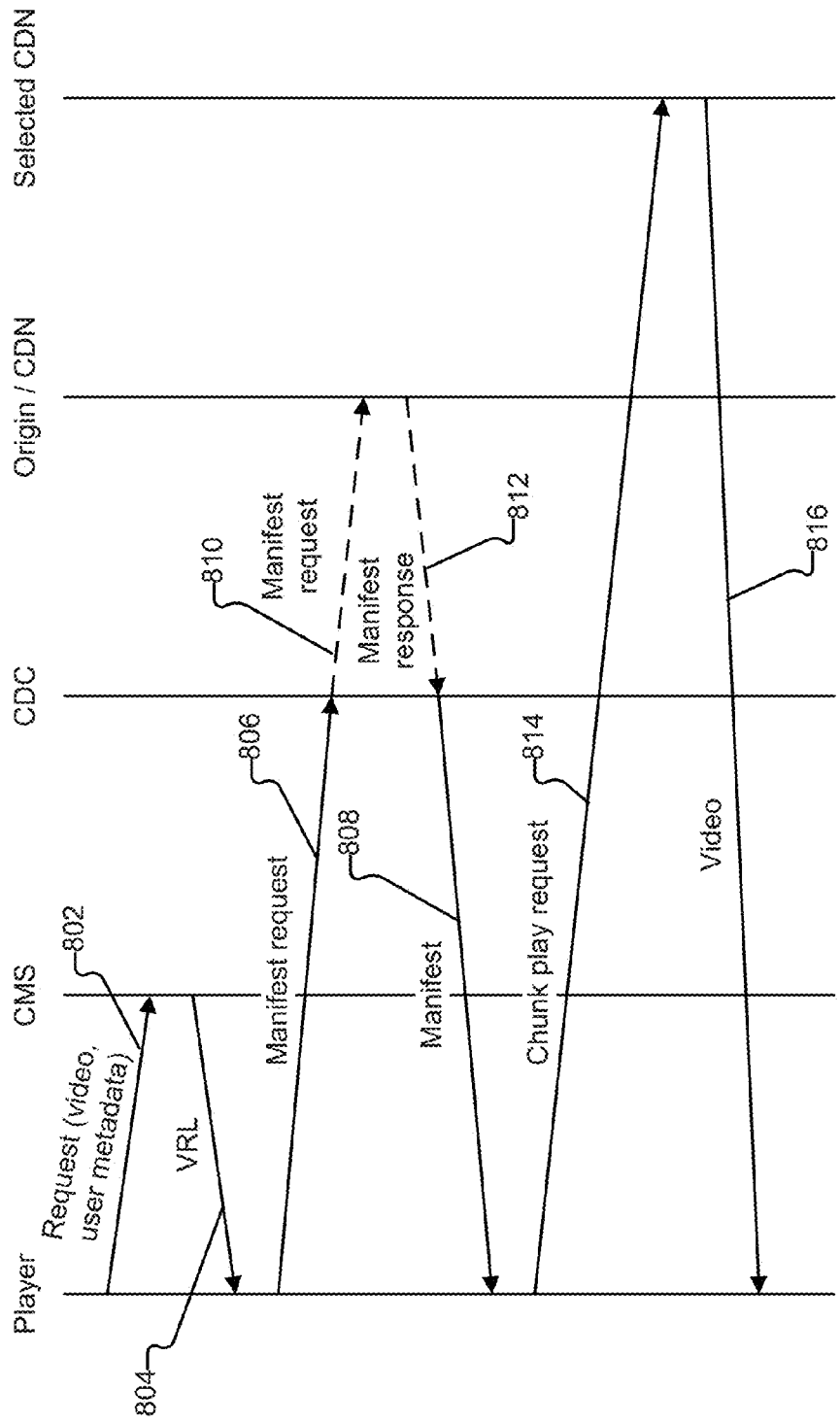
FIG. 8 depicts a call flow used, in some embodiments, to direct a video player to a video source.

FIG. 8 depicts a call flow used, in some embodiments, to direct a video player to a video source. The video distribution depicted in FIG. 8 makes use of HTTP chunking delivery techniques. In HTTP chunking, content is divided into chunks (e.g., with each chunk being 2-10 seconds of data) and then distributed as files via CDNs. Clients download chunks and stitch them together, such that a viewer of the content sees a continuous video stream. A CMS provides metadata associated with a video stream, including the information required to deliver the content, e.g., the URL of a manifest file. In particular, the manifest file contains the URL names of the chunks encoding the content, and can also include the URL/names of other manifest files. Each chunk is encoded at a particular bitrate, and it is stored on a particular CDN or (origin) server. Manifest files can be themselves distributed through CDNs.

Referring now to FIG. 8, an appropriate CDN/bitrate can be initially selected for a client such as client 402, and the selection(s) can also be revised as needed. The call flow is as follows: first, the client sends a request to the CMS (802). In addition to the video being requested, additional information about the user/client is included in the request, or is otherwise obtained by the CMS about the client. The additional user/client information may be limited (e.g., just an IP address, or an IP address and a User Agent string) but can also include a variety of attributes (e.g., client type and display size). As one example, the CMS may be publicly accessible, and not require a user to have an account to watch videos. Further, that CMS may make use of standard video playback capabilities provided by a browser application. In such a scenario, limited information about the client may be provided at 802. As another example, access to the CMS may require a user account, and/or may require a customized player application that can obtain more detailed information about the user/client and provide it at 802. The CMS replies with metadata, including a URL to a manifest file (804).

To control the selection of the CDN and bitrate, an indirection mechanism is used. Specifically, instead of including a traditional URL to the manifest file, the CMS returns a URL that points the client to the CDC. This URL is also referred to herein as a "Virtual Resource Locator" or VRL. The VRL (described in more detail in conjunction with FIG. 9) includes the content name, and encodes other information (e.g., about the device). When the CDC is accessed via a VRL (806), the CDC dynamically generates and sends to the client (808) a manifest file based on the following information: (1) information embedded in the URL; (2) playback quality experienced by other similar clients watching at the same time; (3) a Global IP address; (4) bitrates at which the content is encoded, and the CDNs or origin servers where the content is stored; and (5) Global policies such as the fraction of clients allowed on each CDN, or the maximum arrival rate of new clients at a given CDN. Information associated with (4) can be communicated off-line by the content provider, embedded in the VRL, or obtained from existing manifest files of the content (specified in VRL) that are already stored at various CDNs (see dotted lines 810 and 812).

In the example of FIG. 8, "similar" clients include those clients sharing a subset of attributes with the client making the request. Examples of these attributes include: DMA, ASN, content, content provider, device type, etc. The higher the overlap between the values of the attributes of two clients, the higher the "similarity" of the clients. The quality experienced by similar clients is used by the CDC to accurately predict the quality that the requesting client will experience when streaming at a given bitrate and from a given CDN.

Once the client receives the manifest file (808), the client uses (814) the information in this file to download (816) and start playing the video chunks. In various embodiments, content source/bitrate decision-making is performed on an ongoing, periodic basis, and a given client can be provided with updated instructions midstream. As one example, after ten consecutive chunks are received by a client, the client can be provided with a new VRL 804, or a manifest that includes a VRL (i.e., causing CDC to re-evaluate the client's content source/bitrate) and send revised instructions if warranted. As another example, in some embodiments, clients run dedicated video player applications and/or applications that otherwise natively support a feature that allows the client to periodically evaluate its performance and request revised instructions, e.g., when quality issues are experienced midstream.

Figure 9:
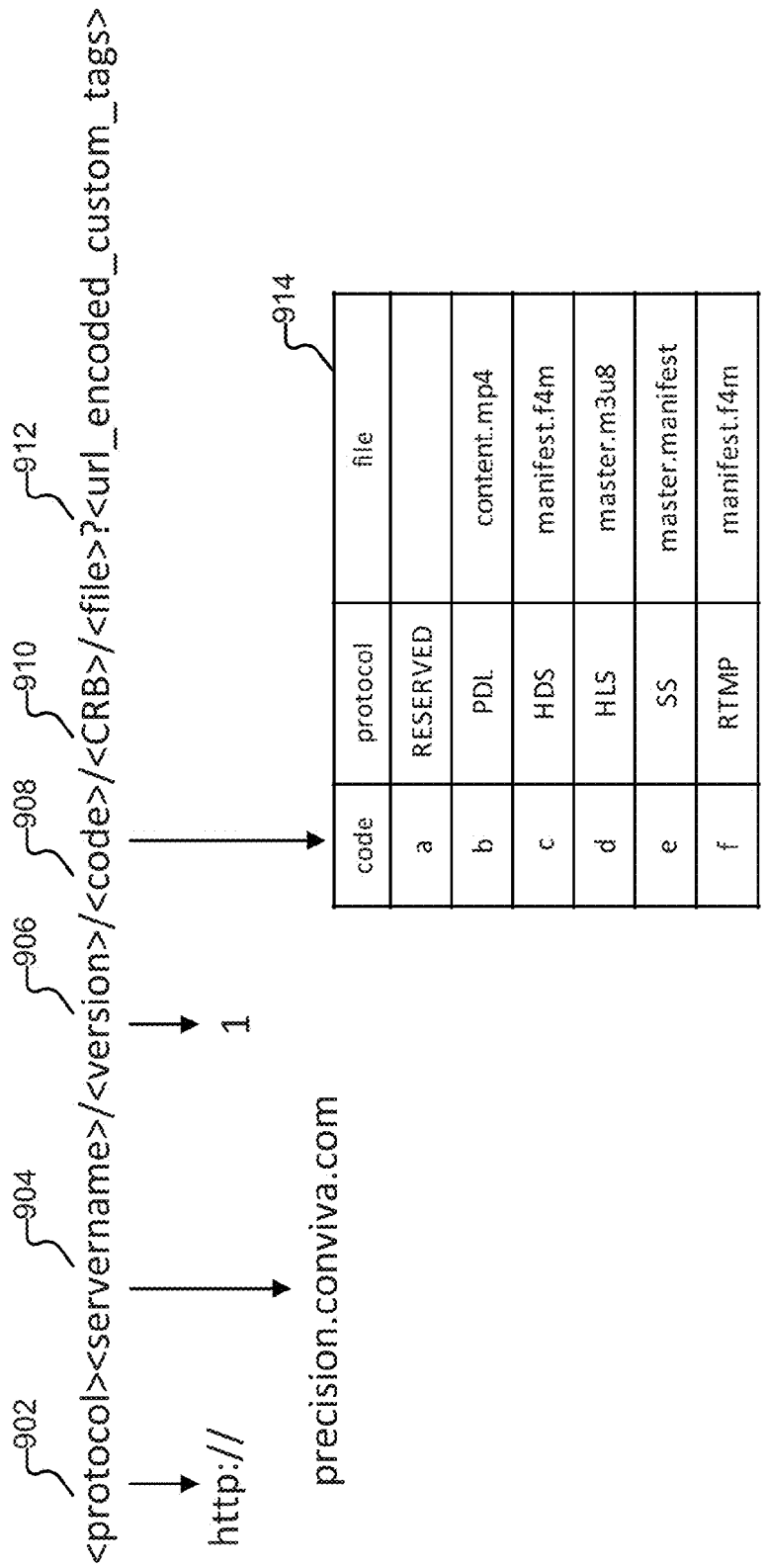
FIG. 9 illustrates an example of a Virtual Resource Locator.

FIG. 9 illustrates an example of a Virtual Resource Locator. As explained above, a VRL is provided by a content provider's CMS to a client requesting content, and is used by the client to invoke the services of the CDC. As shown in FIG. 9, in some embodiments, a VRL includes six regions. The first (902) indicates the protocol being used to perform the request. One example of a protocol is HTTP. The second (904) indicates the location of the CDC (e.g., a DNS name of the CDC). The third (906) indicates the version of VRL being used. One example is version "1." The fourth (908) is a code that indicates a protocol type associated with the data to be retrieved. A chart of example codes is included in FIG. 9 (914). The fifth (910) is a request block that specifies required parameters, such as the asset (content) name, customer ID, bitrates at which the content is stored, and CDNs at which the content is stored. The final region includes the name of what is being requested, and a set of optional parameters encoded as key-value pairs. Examples of such parameters include content metadata (e.g., episode, show, season), content type (e.g., advertisement, short video on demand clip, or live stream).

The following is a list of example optional parameters that can be embedded in portion 912.

tok ("securityToken"): A token generated by the CDC that is passed out-of-band to the video CMS and is validated at request time.

an ("assetName"): a human-readable string describing the video asset. Maximum length: 127 bytes.

at ("assetType"): a string identifying the tuple of the content. May be one of the following values: ON_DEMAND, LIVE_EVENT, LINEAR_LIVE, EVENT_REPLAY, OTHER.

dvt ("deviceType"): a string indicating the form-factor type of the device. May be one of the following: PC, MOBILE, CONSOLE, SETTOP, SMART_TV, OTHER.

dvb ("deviceBrand"): a string that names the brand of the device. Maximum length is 64 bytes. For example, "Roku," "Microsoft."

dvm ("deviceModel"): a string that defines the model of the device. Maximum length is 64 bytes. For example, "Xbox 360."

dvv ("deviceVersion"): a string representing the firmware version number of the device. Maximum length is 64 bytes.

dvc ("deviceConnection"): a string describing the last-mile access connection the video device has to the Internet. May have one of the following values: T1, CABLE, DSL, WIFI, 4G, 3G, OTHER.

dvid ("deviceId"): a string defining a unique device identifier. Must be less than 127 bytes. For example, UDIDs for iOS devices.

drm: ("drmType"): The type of digital rights management technology used. May be one of the following: MICROSOFT_PLAY_READY, APPLE_FAIR_PLAY, ADOBE_ACCESS, MARLIN, ADOBE_PHDS, ADOBE_PHLS, OTHER, NONE.

os: a string naming the operating system in which the video is playing. Maximum length is 64 bytes.

osv ("osVersion"): a string indicating the full version number of the operating system indicated under "os," if any. Maximum length is 64 bytes.

vid ("viewerId"): a string identifying the video sessions of a single viewer, without collecting any personally identifiable information. Typically a hashed/obfuscated version of a Subscriber ID. Maximum length is 127 bytes.

<other customer meta-data> For example:
"serviceType": "SkyGo"
"show": "PopIdol"
"episode": "S8:E5"

Figure 10:
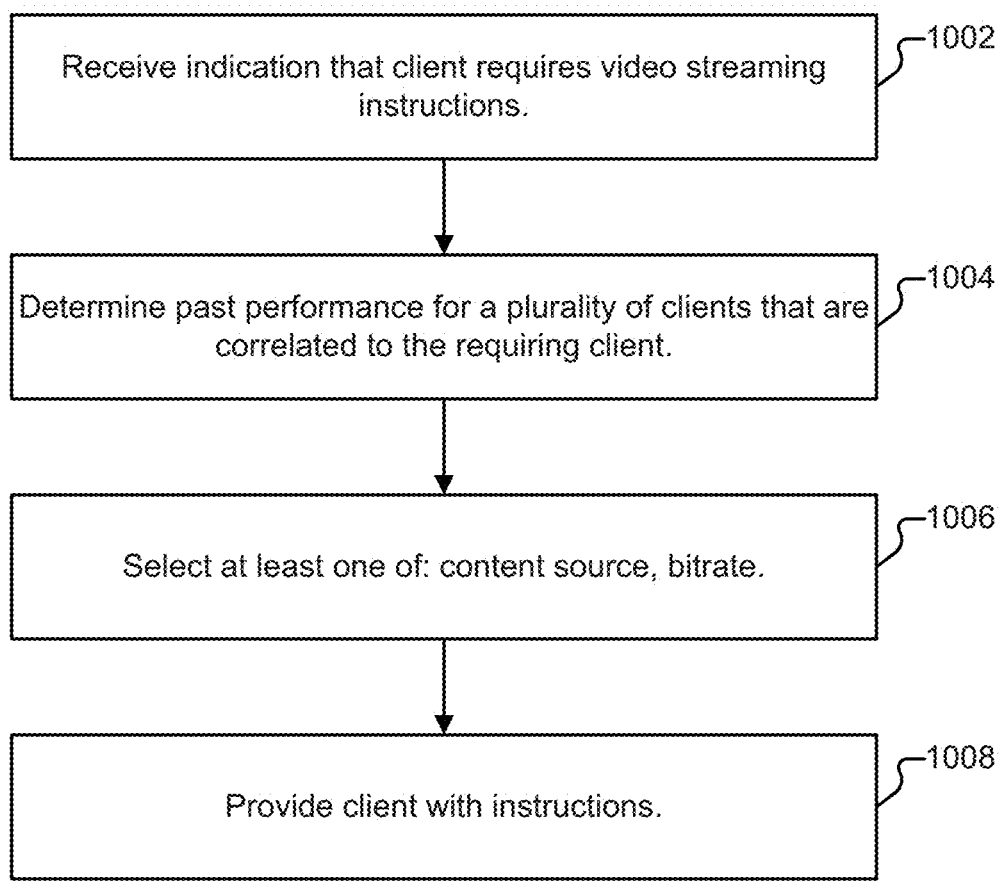
FIG. 10 illustrates an embodiment of a process for directing a video player to a video source.

FIG. 10 illustrates an embodiment of a process for directing a video player to a video source. In some embodiments, process 1000 is performed by content distribution coordinator 408. As explained above, content distribution coordinator 408 can be operated independently, but can also be operated by an operator of a content management system (e.g. CMS 406) or other entity, such as an operator of a CDN. Accordingly, in some embodiments scenarios, other components may perform process 1000, instead of or in addition to CDC 408. Further, multiple components may cooperate to perform process 1000.

The process begins at 1002 when an indication that a client requires video streaming instructions is received. In some embodiments, portion 1002 of the process is performed when CDC 408 is contacted by client 102 as a result of client 102 receiving a VRL from CMS 406 and being directed to CDC 408. In other embodiments, portion 1002 of the process is performed when a CMS receives a request for a resource, and contacts CDC 408 on behalf of the requesting client.

At 1004, past performance for a plurality of clients that are correlated to the requiring client is determined. As one example, portion 1004 of the process is performed when CDC 408 receives attributes about the requesting client, determines (e.g., from partitions 412) which other clients are most similar to the requesting client, and evaluates those clients performance history. Suppose a determination is made that the requesting client is in a particular DMA and ASN. The performance history of other clients in the same DMA and ASN is examined at 1004.

In some embodiments, a video director engine included in CDC 408 is configured to perform the actions of (a) determining which set of clients are most similar to the requesting client, and (b) evaluating their performance history. The clients most similar to the requesting client need not be requesting (or have requested) the same content as is requested by the client. For example, other clients in the same DMA and ASN may be (have been) watching other movies from movie video service 112. As a further example, correlated clients may be (have been) watching video provided by other services, such as sports video service 114. CDC 408 can be configured to collect statistical information from a wide variety of clients, including clients associated with multiple services (e.g. services 112 and 114), and can use the collected information to aid in decision-making.

At 1006, at least one of: a content source, and a bitrate, is determined based at least in part on the past performance information examined at 1004. As one example, the correlated clients' performance with respect to different CDNs can be examined (e.g., at 1004), and a decision that the requesting client should obtain content from a particular CDN can be made based on the examination (e.g., as described in conjunction with FIG. 6). As another example, the current average bitrate of the correlated clients can be selected for use with the requesting client. A bitrate selection performed in this way can have a particularly positive impact on the experience of a user viewing short video clips, as contrasted with picking a default bitrate and adjusting the bitrate up or down empirically (either while the video plays, or as part of an initialization). As yet another example of the processing performed at 1006, a particular CDN node can be determined for the client (e.g., where an owner of a CDN network is operating CDC 408, or is otherwise using CDC 408 to assist in CDN node selection).

In some embodiments, the decision made at 1006 is based wholly, or predominantly, on the performance information of correlated clients. As one example, in the case of a video service that offers short clips and does not require users to log in, very little, if any, information may be known about the specific requesting client. Further, as explained above, the requesting client may be running a standard browser application that does not provide details about the client/the client's performance to other entities such as CMS 406 or CDC 408. In other embodiments, the performance information of correlated clients is one of multiple factors in deciding a content source and/or bitrate for the client. For example, if CMS has existing information about the client (e.g., because it has stored historical performance information about the client), or if CDC 408 has information about the client (e.g., because the client is already streaming content and/or is reporting statistical information to either of CMS 406 or CDC 408), the decision made at 1006 can be based both on knowledge about the client, as well as knowledge about clients correlated with the client.

Finally, at 1008, instructions are provided to the client. As one example, instructions are provided to the client at 1008 when a CDC provides a manifest to a client (e.g., 808). As another example, where CMS 406 contacts a CDC to obtain instructions on behalf of a client, the CMS provides the obtained instructions to the client at 1008.

Additional Detail Regarding Embodiments of the Content Distribution Coordinator

Figure 11:
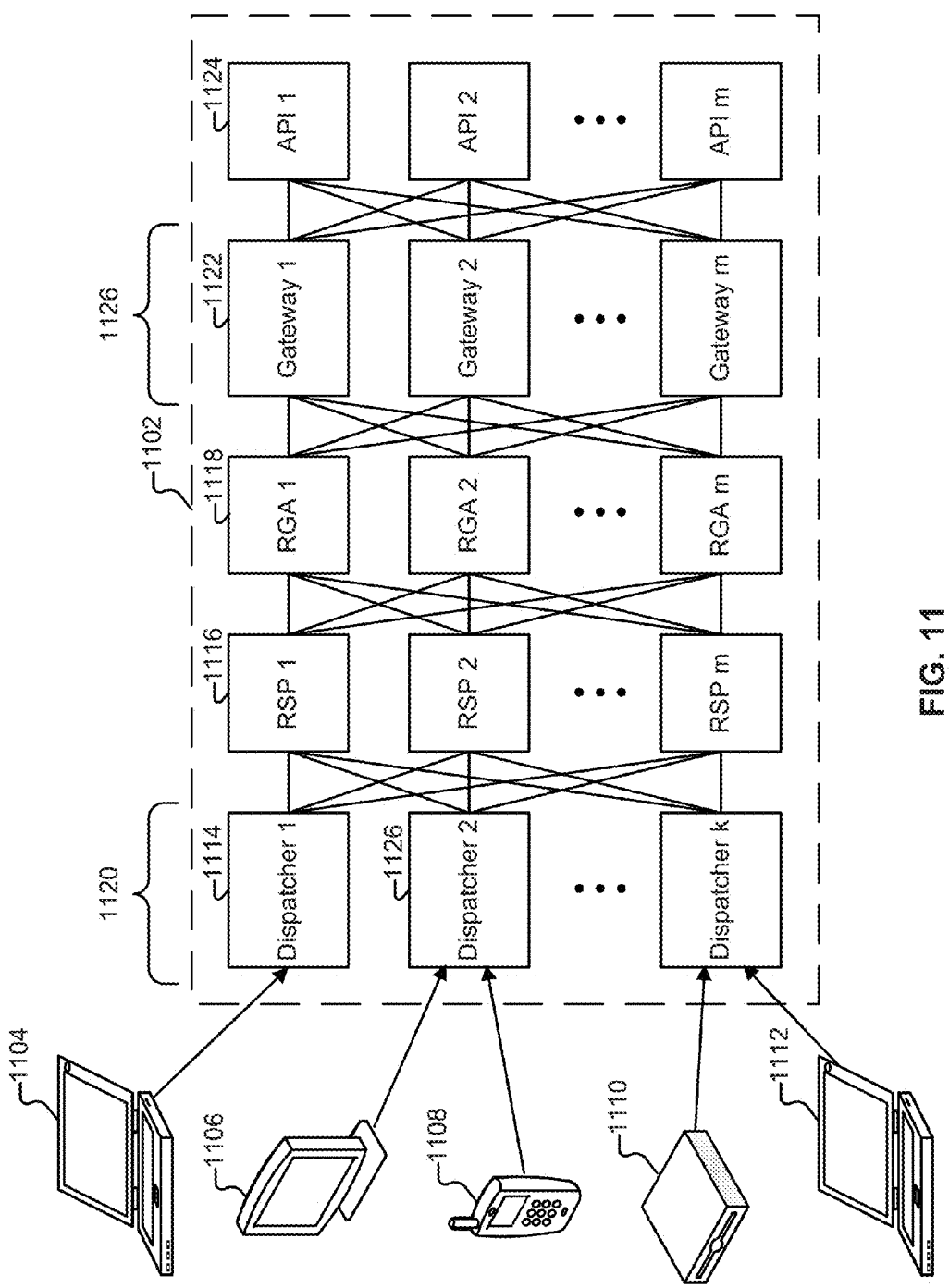
FIG. 11 is an illustration of an environment in which status information is received and processed.

FIG. 11 is an illustration of an environment in which status information is received and processed. In particular, clients included in the environment provide periodic status reports (also referred to as "heartbeats") containing telemetry data to a content distribution such as CDC 408. In various embodiments, the services provided by the content distribution coordinator are implemented across a scalable infrastructure, particularly in embodiments where telemetry data is received from many clients. In the example shown, the elements contained within dashed region 1102 collectively provide the functionality of content distribution coordinator 408. Each of the layers (e.g., dispatcher layer 1120) is horizontally scalable and their respective components can be implemented on standard commercially available server hardware (e.g., having a multi-core processor, 4G+ of RAM, and Gigabit network interface adaptors) running a typical server-class operating system (e.g., Linux).

Clients 1104-1112 each include a monitoring module that collects status information. As one example, performance information associated with video playback is collected, is other information about the client (e.g., information usable for partitioning as described above). Note that clients 1104-1112 can represent a subset of all clients included in an environment such as is shown in FIG. 1 or FIG. 4. That is, a client such as client 102 need not include a monitoring module. Instead, in some embodiments, data from those clients with monitoring modules is used to make predictions about other clients (e.g., client 102).

When the monitoring module on a client is activated (e.g., because the client has started an instrumented video player), the client is mapped to a dispatcher server. As one example, when the monitoring module starts, it reads a configuration file that includes a list of dispatcher servers. The monitoring module selects a dispatcher server at random from the list.

A dispatcher server (1114) includes two conceptual modules. The first module implements a communication interface for receiving status information from clients. In some embodiments the module is implemented using an off-the-shelf web server, and allows clients to connect over the HTTP protocol (and also allows clients to securely communicate via SSL). Data received by the first module is passed to the second module. The second module normalizes the data (to a format suitable for further processing) and passes the normalized data to a real-time stream processing component (1116).

The real-time stream processing (RSP) layer includes an optimized software component that processes the telemetry data that it receives from the dispatcher in real-time. A dispatcher sends all heartbeats belonging to the same session to the same RSP component.

In some embodiments, the RSP component is implemented as a continuously running service that reads and processes the telemetry data received from dispatchers via the network over TCP. The telemetry data stream comprises individual records, each of which represents the telemetry data sent by the monitoring module. The RSP component reads network data one record at a time and parses the data into a local data representation. The data received by the RSP component can be stored as in-memory hash tables of records allowing fast execution, and very high throughputs. Since the RSP component does not require old information, it can periodically purge the in-memory hash tables and increase scalability accordingly. In other embodiments, optimized in-memory databases are used.

An example mapping function to map heartbeats having a session identifier "ID" to a particular RSP component "i" as follows:

i=hash(ID) mod m, where hash( ) is a hash function and "m" is the total number of RSP components.

Once an RSP component parses the data records, it performs two main tasks. First, it performs data filtering. A filter is a logical expression and is installed at each RSP component instance. As one example, the following filter would identify viewers located in San Francisco, connected to ISP SP1, streaming from CDN A, one of two particular shows:

(city="San Francisco" AND ISP="SP1" AND CDN="CDN A" AND ((show="NewsAt10") OR (show="SundayMagazine"))

For each message of incoming telemetry data, the (key, value) pairs in the record are matched against the filter. If the filter is matched, the data is associated with the filter.

The second task performed is to compute snapshots and on-line statistics over the telemetry data matching each filter. One example of a snapshot is the number of players that are in a particular state (e.g., "playing"). The RSP component generates sequences of these snapshots (e.g., one every second). Examples of statistics computed by the RSP component include: the average number of bytes played over all video streams matching a filter over a given time interval (e.g., 10 seconds) and the minimum frames per second experienced by a stream matching a filter over a time interval. Snapshots and statistics are updated continuously, from new telemetry data received from clients.

The RSP component provides its computed snapshots and statistics to a real-time global aggregation component (1118). The real-time global aggregation (RTGA) component aggregates the information provided by the RSP component for each filter.

As explained above, each RSP component (1116) receives (via a dispatcher) telemetry data from a subset of the monitoring modules and calculates snapshots and statistics for all filters. Each RGA component instance is in turn responsible for a subset of the filters. Based on the identifier of the filter, all RSP components send data for that filter to a single RGA component. The RGA component combines the data from all RSP components for the filters that it is responsible for, resulting in a global snapshot and statistics based on information from all monitoring modules. Examples of aggregation operations performed by an RGA component include: counting the total number of viewers that match a particular filter, determining the percentage of viewers matching a given filter that are in buffering state, the join time distribution experienced by viewers joining a given stream, the current number of viewers in a given city, the rank of the most popular live events, and so on.

In some embodiments an RGA component's functionality is implemented as a continuously running service. It reads records sent by the RSPs asynchronously, thus achieving a high throughput. The RGA component stores the records it receives in in-memory hash tables allowing optimized access for real-time processing. Old information is periodically purged from the hash tables to improve efficiency.

As shown in FIG. 11, gateway 1122 provides a web service API 1124 for accessing data. Through the API, RGAs data is available on a per-filter basis. In addition, it also exposes APIs to edit and install new filters and aggregation functions. In some embodiments gateway 1122 is implemented using an off-the shelf web server (such as Apache) with customized code to handle the various web service API calls. The handlers return data for a given web API call in various data formats including XML, JSON, SOAP, and HTML, as applicable. The handlers serve as middleware for querying and interactively controlling the RSPs and RGAs.

Gateway 1122 also provides access controls and persistently stores the information regarding the API requests, data access and presentation policies, and filter descriptions. The information is maintained in a persistent database, such as mySQL or Oracle database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a set of one or more processors configured to:
        receive an indication that a client requires video streaming instructions;
        access a data store including information associated with a plurality of clients;
        partition, based on a set of one or more attributes, the plurality of clients to identify a subset of the plurality of clients that are correlated with the client requiring video streaming instructions;
        aggregate past download performance for the identified subset of clients that are correlated to the client requiring video streaming instructions;
        use the aggregated past download performance for the identified subset of correlated clients to predict, at least one of: a content source, and a bitrate, for the client requiring video streaming instructions, wherein the content source comprises at least one of: a Content Delivery Network (CDN) and a CDN node; and
        provide the client with instructions based at least in part on the prediction; and
    a memory coupled to the set of one or more processors and configured to provide the set of one or more processors with instructions.

2. The system of claim 1 wherein the client requiring video streaming instructions and the identified subset of clients are correlated at least in part by sharing a common Autonomous System Number (ASN).

3. The system of claim 1 wherein the client requiring video streaming instructions and the identified subset of clients are correlated at least in part by sharing a common Designated Market Area (DMA).

4. The system of claim 1 wherein the client requiring video streaming instructions and the identified subset of clients are correlated at least in part by sharing a common attribute.

5. The system of claim 4 wherein the shared attribute comprises at least one of a shared operating system and a shared application version.

6. The system of claim 4 wherein the shared attribute comprises a shared streaming protocol.

7. The system of claim 4 wherein the shared attribute comprises a shared device network type, wherein the shared device network type comprises at least one of: wireless DSL, wired DSL, wired cable, and optical.

8. The system of claim 1 wherein the indication is received from the client.

9. The system of claim 1 wherein the indication is received from a Content Management System.

10. The system of claim 1 wherein the indication is received from a client by a Content Management System.

11. The system of claim 1 wherein the indication is associated with a new request by the client for content.

12. The system of claim 1 wherein the indication is associated with a continuing request by the client for content.

13. The system of claim 12 wherein the continuing request is associated with HTTP chunking.

14. The system of claim 12 wherein the continuing request is associated with a manifest.

15. The system of claim 1 wherein the instructions comprise an HTTP redirect.

16. The system of claim 1 wherein the instructions are included in a manifest.

17. The system of claim 1 wherein the instructions are encoded in a Virtual Resource Locator.

18. The system of claim 1 wherein the selecting includes using a percentile to evaluate a predicted performance of the client.

19. The system of claim 1 wherein instructions provided to the client include at least one change to instructions currently being used by the client.

20. A method, comprising:
    receiving an indication that a client requires video streaming instructions;
    accessing a data store including information associated with a plurality of clients;
    partitioning, based on a set of one or more attributes, the plurality of clients to identify a subset of the plurality of clients that are correlated with the client requiring video streaming instructions;
    aggregating past download performance for the identified subset of clients that are correlated to the client requiring video streaming instructions;
    using the aggregated past download performance for the identified subset of correlated clients to predict, using a set of one or more processors, at least one of: a content source, and a bitrate, for the client requiring video streaming instructions, wherein the content source comprises at least one of: a Content Delivery Network (CDN) and a CDN node; and
    providing the client with instructions based at least in part on the prediction.

21. A computer program product embodied in a non-transitory computer readable storage medium and comprising computer instructions for:

receiving an indication that a client requires video streaming instructions;

accessing a data store including information associated with a plurality of clients;

partitioning, based on a set of one or more attributes, the plurality of clients to identify a subset of the plurality of clients that are correlated with the client requiring video streaming instructions;

aggregating past download performance for the identified subset of clients that are correlated to the client requiring video streaming instructions;

using the aggregated past download performance for the identified subset of clients to predict, at least one of: a content source, and a bitrate, for the client requiring video streaming instructions, wherein the content source comprises at least one of: a Content Delivery Network (CDN) and a CDN node; and providing the client with instructions based at least in part on the prediction.

* * * * *